United States Patent [19]

Mitani et al.

[11] Patent Number: 4,547,807
[45] Date of Patent: Oct. 15, 1985

[54] CCD IMAGER

[75] Inventors: Nobuhiro Mitani, Ogaki; Toshihiro Furusawa, Gifu, both of Japan

[73] Assignee: Sanyo Electric Co., Ltd., Osaka, Japan

[21] Appl. No.: 673,252

[22] Filed: Nov. 20, 1984

[30] Foreign Application Priority Data

Nov. 22, 1983 [JP] Japan .................. 58-219784

[51] Int. Cl.⁴ ............................................. H04N 3/14
[52] U.S. Cl. ........................................ 358/213; 357/24
[58] Field of Search ............. 358/213, 163, 167, 54, 358/214; 357/24 LR; 250/578

[56] References Cited

U.S. PATENT DOCUMENTS

| | | | |
|---|---|---|---|
| 3,904,818 | 9/1975 | Kovac | 358/213 |
| 4,010,319 | 3/1977 | Levine | 358/213 |
| 4,490,774 | 12/1984 | Levine | 358/213 |

*Primary Examiner*—Gene Z. Rubinson
*Assistant Examiner*—Stephen Brinich
*Attorney, Agent, or Firm*—Armstrong, Nikaido, Marmelstein & Kubovcik

[57] ABSTRACT

A CCD imager includes a CCD from which a video signal added with a smear signal and the smear signal itself are produced. Using a subtracter, the smear signal is removed from the video signal from CCD. When the video signal from CCD exceeds a predetermined level indicating that the charge accumulated in the CCD is regulated to the maximum available voltage with the excess charge being drained away, the video signal from the CCD before being subtracted is selected. Accordingly, an image having no undesirable dark spot within the bright area can be reproduced.

1 Claim, 10 Drawing Figures

CCD IMAGER

BACKGROUND OF THE INVENTION

1. Field of the invention

The present invention relates to an imager employing CCD (charge-coupled device) and, more particularly, to an improvement in reducing a smear on a reproducing image.

2. Description of the Prior Art

Recently, many improvements have been made to an imager for use, for example, in a television camera, and one of which is the employment of a solid state CCD in place of the imaging tube, resulting in a compact size of the camera.

Such a solid state imager is defined by a plurality of photoelectric transducers aligned in two directions orthogonal to each other. When an image is formed on the solid state imager, each photoelectric transducers stores a charge which is in relation to the intensity of the impinged light thereon, thereby forming a charge pattern of one field. The charge pattern is transferred to a register, from which a charge signal is read out serially. When the image formed on the solid state imager has a bright portion, such as a bright spot light, an extra charge will be added, during the transfer of the charged pattern, to the photoelectric transducers on which the bright spot light is traced. Such an extra charge will result in an unpleasant smear in the reproduced image.

Conventionally, there have been proposed a number of arrangements which can reduce the smear. Such an arrangement is disclosed, for example, in U.S. Pat. No. 4,010,319 to Peter Alan Levine, or in Japanese Patent Laid-Open application No. 57-17276 to Michio Masuda et al.

One arrangement according to the prior art CCD imager is shown in FIG. 1, and which includes a frame transfer type CCD 1 having first register 11, second register 12, and readout resistor 13. In first register 11 defining an imaging area, photoelectric transducers P' in the bottom row are masked and the other photoelectric transducers P are provided to receive light image. Second register 12 defining a storage area and readout register 13 are also masked. When the clock pulse is applied to CCD 1, an image integration period (for example, 16.1 milliseconds) and an image transfer period (for example, 0.5 millisecond) are repeated alternately. It is assumed that a scene having one bright circle spot is projected on first register 11.

Before the first integration period starts, a "field" with no image information appears in first register 11 as if a "field" is pulled down across first register 11 in a blind pull down manner. First register 11 receives light even during the "field" is pulled down. Accordingly, the photoelectric transducers P' in the last row H' carry a signal obtained by the quick scan of the new field vertically across the light receiving area. When the image formed on the field has no outstanding bright portion, the signal in the last row H' is so low that it can be disregarded. On the contrary, when the image on the field has a bright portion, such as a bright spot, a photoelectric trandsducer will be integrated to a small degree even during the field scans across that bright spot. Thus, in such a case, the charge distribution along line Lm shown in FIG. 3a which extends through the masked last row H' has a small mount as indicated in graph $G_{Lm}$. Since such a small mount appears on, and added to, every horizontal line a vertical smear will appear in that field. Thus, the signal shown in graph $G_{Lm}$ is called a smear signal.

During the first integration period, photoelectric transducers P are integrated, each charged to a level relative to the brightness of the received light. Accordingly, the received image is changed to a charge pattern on photoelectric transducers P. The charge distribution along line L1 shown in FIG. 3a which intersects the spot image is indicated in graph $G_{L1}$.

Then, in the first transfer period, which corresponds to the vertical blanking period of the commercial television system, the charge signals which have accumulated one "field" are transferred, in parallel, in the column direction from register 11 to resistor 12, such that the charge in the photoelectric transducers P in the first row from the top are transferred to those in the second row, and so on. During the transfer period, a next new field appears in first register 11 as the same manner described above in the blind pull down manner.

Then, in the second integration period, the charge pattern is formed in the same manner described above, and at the same time, the signals stored in the second register 12 are readout through the readout register 13 serially such that the first readout line signal, which is the smear signal carried in the last row H' in photoelectric transducers P', is transferred and stored in line memory 2. After the readout of the smear signal, switch S changes its connection from the condition shown in FIG. 1 to such that terminal Ta is connected to terminal Tc and terminal Td is connected to terminal Tf. Accordingly, the readout signal through terminals Ta and Tc and the smear signal from line memory 2 are transferred at the same time to subtracter 3 at which readout signal is subtracted by smear signal. The subtracted result, such as indicated in graph $G_{L1-Lm}$, is produced from the subtracter 3. When the subtraction is carried out for each horizontal line signal, an image without a smear, such as shown in FIG. 3b, can be reproduced.

According to the prior art CCD imager described above, a problem is created when the imager is provided with an overflow drain, bus, for the reduction of the blooming. FIG. 2 diagrammatically illustrates an arrangement of overflow drain 14 interleaving the aligned photoelectric transducers P. When a very bright image is impinged, photoelectric transducers generate much more charge signal than can be stored at that location. The excess charge tends to spread to the adjacent locations along the chargecoupled channel, resulting as "blooming" of the image. But when overflow drain 14 is provided, the excess charge, which is above a predetermined level Vmax, flows through the overflow drain 14, thereby eliminating undesirable blooming.

In the case where overflow drain 14, or the like which reduces the blooming, is employed in combination with the above described smear reducing arrangement, a problem arises as explained below.

When a very bright image, such as a very bright spot light as shown in FIG. 4a, impinges on the CCD array, the charge distribution along line L1 would have a flat top, restricting the maximum voltage to Vmax, as indicated in graph $G_{L1}$. When the smear signal shown in graph $G_{Lm}$ is subtracted from the line signal along line L1, the flat top will be recessed, as shown in graph $G_{L1-Lm}$, providing a dark portion at the center of the spot, as illustrated in FIG. 4b.

SUMMARY OF THE INVENTION

The present invention has been developed with a view to substantially solving the above described problem and has for its essential object to provide an improved CCD imager which can reduce the smear and, at the same time, which can reduce the blooming around a bright image without producing any dark portion at the center of the bright image.

It is a further object of the present invention to provide an improved CCD imager which is simple in construction.

In accomplishing these and other objects, a CCD imager according to the present invention comprises a CCD having a plurality of photoelectric transducers aligned vertically and horizontally, with at least one horizontal line being masked. The CCD produces unmasked horizontal line signals obtained from the unmasked horizontal lines and masked horizontal line signal obtained from the masked horizontal line. A line memory coupled to the CCD stores the masked horizontal line signal and produces the masked horizontal line signal repeatedly and serially. A subtracter is connected to the line memory for subtracting the masked horizontal line signal from each unmasked horizontal line signal and for producing a subtracted signal. A comparator is provided for comparing the unmasked horizontal line signal with a threshold voltage obtained from a constant voltage source and for producing a first signal when the unmasked horizontal line signal is below the threshold voltage, and a second signal when the same is above the threshold voltage. A switch means is coupled to the comparator for permitting the subtracted signal to pass therethrough when the first signal is produced, and for permitting the unmasked horizontal line signal to pass therethrough when the second signal is produced.

BRIEF DESCRIPTION OF THE DRAWINGS

These and other objects and features of the present invention will become apparent from the following description taken in conjunction with a preferred embodiment thereof with reference to the accompanying drawings, throughout which like parts are designated by like reference numerals, and in which.

DESCRIPTION OF THE PREFERRED EMBODIMENTS

Figure 1:
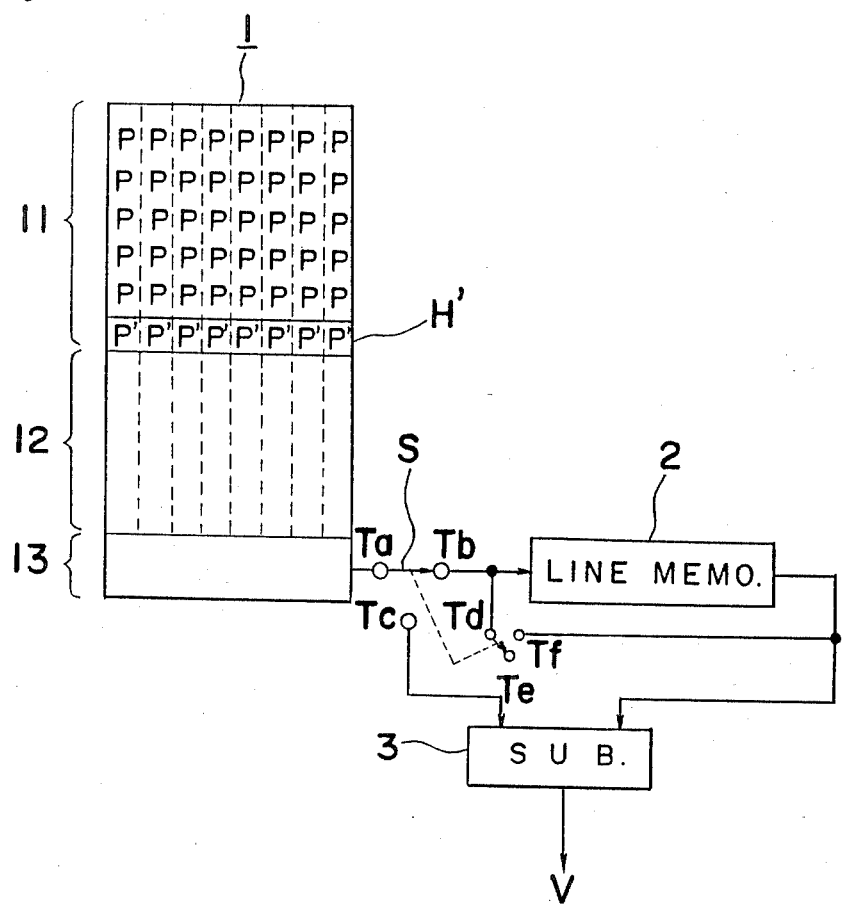
FIG. 1 is a circuit diagram of a CCD imager according to the prior art.
Figure 2:
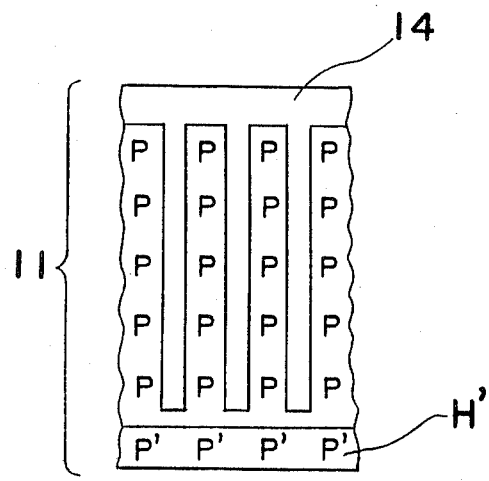
FIG. 2 is a diagrammatic view of an array of photoelectric transducers in the CCD provided with an overflow drain.
Figure 3A:
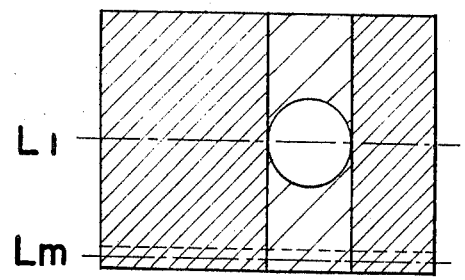
FIG. 3a is a diagrammatic view showing a vertical smear appearing on a reproduced image of a bright spot, and also showing graphs of charge distribution along particular lines L1 and Lm, and a produced video signal.
Figure 4A:
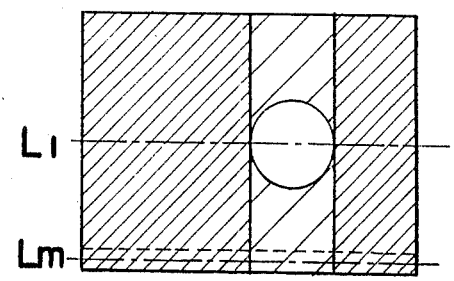
FIG. 4a is a diagrammatic view showing a vertical smear appearing on a reproduced image of a very bright spot, and also showing graphs of charge distribution along particular lines L1 and Lm, and a produced video signal.
Figure 4A:
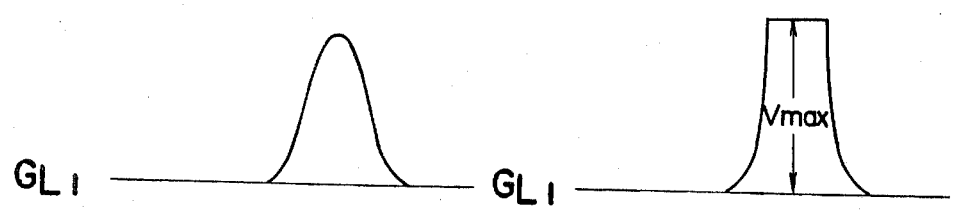
Figure 4A:
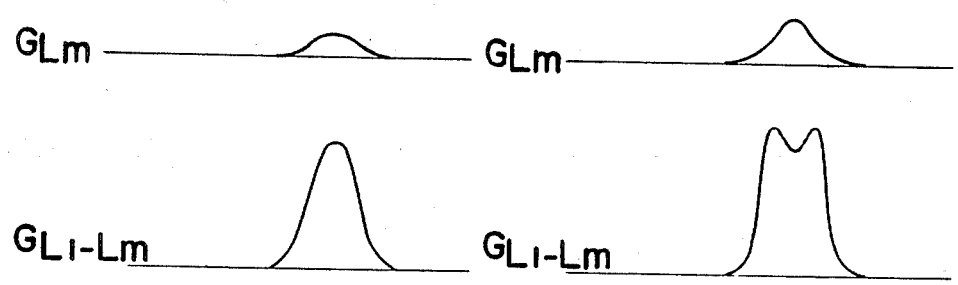
Figure 3B:
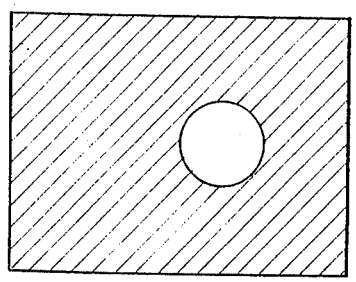
FIG. 3b is a diagrammatic view showing a reproduced image with the smear being removed.
Figure 4B:
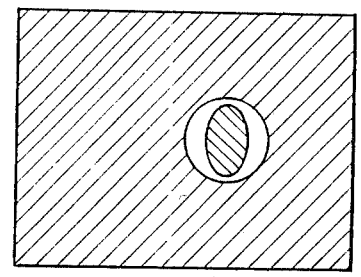
FIG. 4b is a diagrammatic view showing a reproduced image with the smear being removed, but having unwanted dark portion within the bright portion.
Figure 5:
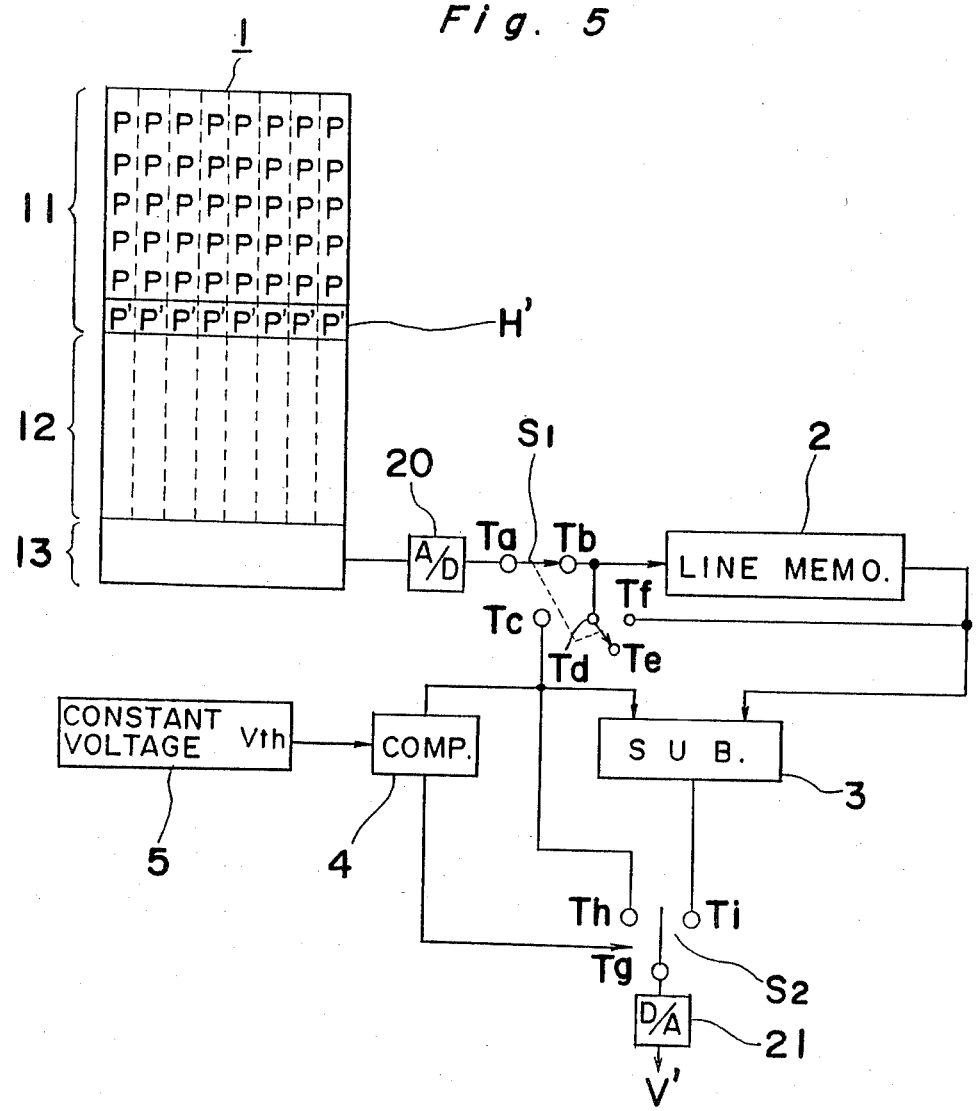
FIG. 5 is a circuit diagram of a CCD imager according to the present invention.

Referring to FIG. 5, a CCD imager according to the present invention is shown. When compared with the prior art CCD imager shown in FIG. 1, the imager according to the present invention further has a comparator 4 coupled with a constant voltage source 5 and a switch S2. Thus, it is understood that the CCD imager of FIG. 5 has an overflow drain, such as 14 shown in FIG. 2, or the like, which prevents the blooming.

Switch S2 has terminals Tg, Th and Ti in which Th is connected to terminal Tc of switch S1, Ti is connected to subtracter 3, and Tg is an output which is either connected to terminal Th or Ti. The switch S2 is controlled by the output signal from comparator 4.

Comparator 4 has its one input connected to terminal Tc of switch S1 for receiving readout signal from CCD 1 when switch S1 connects its terminals Ta and Tc. Another input of comparator 4 is connected to constant voltage source 5 for receiving a threshold voltage Vth, which is a little below the voltage Vmax of the overflow drain. The output of comparator 4 is connected to switch S2.

Figure 7A:
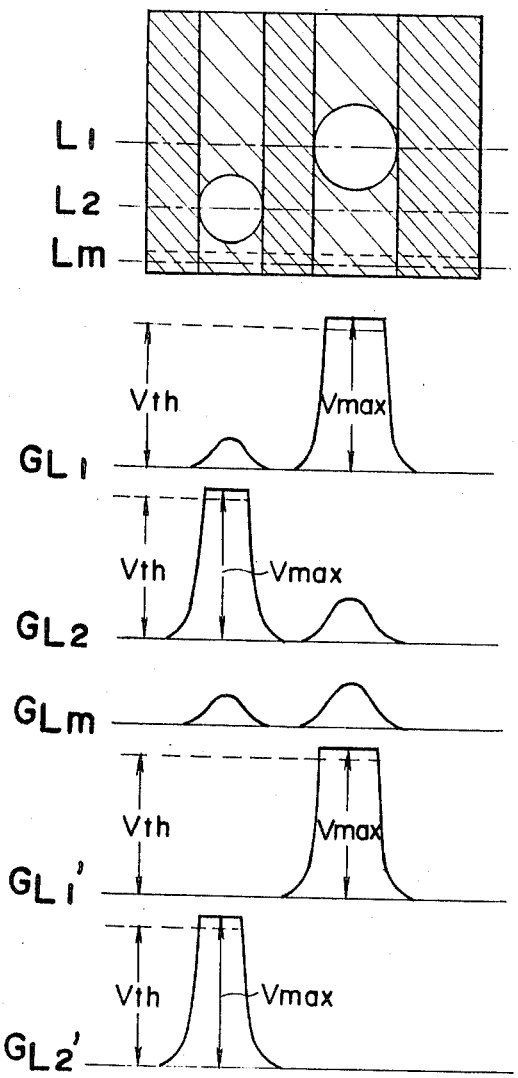
FIG. 7a is a diagrammatic view showing a vertical smears appearing on a reproduced image of very bright spots, and also showing graphs of charge distribution along particular lines L1, L2 and Lm, and a produced video signal.

The operation of the CCD imager according to the present invention is described below with an assumption that the image CCD 1 includes two bright circle spots, as shown in FIG. 7a.

When the readout signal from CCD 1 as obtained from terminal Tc is smaller than the threshold level Vth, that is when the image corresponding to that signal has a brightness below a certain level, such as shown by round-top mountains in graphs $G_{L1}$ and $G_{L2}$ in FIG. 7a, comparator 4 produces a signal for effecting switch S2 to connect its terminal Ti with terminal Tg, thereby producing a subtracted video signal from output terminal Tg. Accordingly, a video signal without smear is produced from terminal Tg.

On the contrary, when the readout signal from CCD 1 as obtained from terminal Tc is greater than that of the threshold level Vth, that is when the image corresponding to that signal has a brightness above a certain level, such as shown by flat-top mountains in graphs $G_{L1}$ and $G_{L2}$ in FIG. 7a, comparator 4 produces a signal for effecting switch S2 to connect its terminal Th with terminal Tg, thereby producing a video signal without being subtracted from output terminal Tg. Accordingly, an image having no undesirable dark spot within the bright area can be reproduced.

Figure 7B:
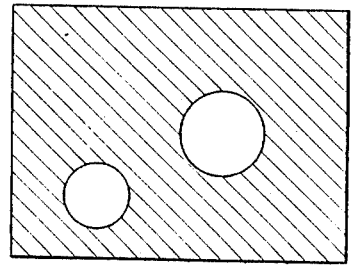
FIG. 7b is a diagrammatic view showing a reproduced image with the smear being removed without any unwanted dark portion within the bright portion.

In FIG. 7a, graphs $G_{L1}$, $G_{L2}$ and $G_{Lm}$ show video signals obtained along lines L1, L2 and Lm, respectively, before the unwanted smear signals are removed. When the signal shown by graph $G_{L1}$ is processed in the circuit of FIG. 5, it is changed to the signal shown by graph $G_{L1}'$ in which the round-top mountain is eliminated, but no change in the flat-top mountain. A similar change is seen in the signal shown by graph $G_{L2}$. Thus, by the use of signals such as shown by graphs $G_{L1}'$ and $G_{L2'}$, the reproduced image has no smear and no dark spot within the bright area, as shown in FIG. 7b.

Figure 6:
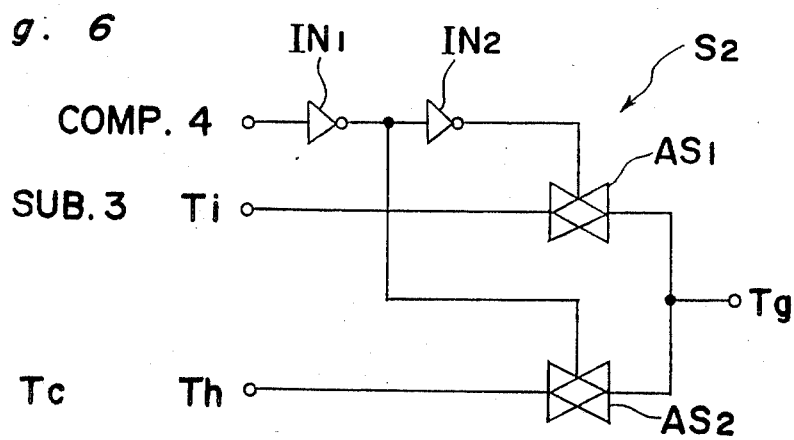
FIG. 6 is a circuit diagram of a switch arrangement shown in FIG. 5.

Referring to FIG. 6, one preferred embodiment of switch S2 is shown, which is formed by a logic circuit. Terminal Ti is connected to analog switch AS1. Similarly, terminal Th is connected to analog switch AS2. The outputs of analog switches AS1 and AS2 are connected to each other and further to output terminal Tg. A line from comparator 4 is connected to inverter IN1 which is connected to another inverter IN2 and also to a control terminal of analog switch AS2. The output of inverter IN2 is connected to a control terminal of analog switch AS1.

Comparator 4 in combination with switch S2 of FIG. 6 is designed to operate such that when the readout signal from CCD 1 as obtained from terminal Tc is smaller than the threshold level Vth, that is when the image corresponding to that signal has a brightness below a certain level, comparator 4 produces a HIGH signal. Thus, inverter IN1 produces a LOW signal to brake analog switch AS2, and inverter IN2 produces a HIGH signal to make analog switch AS1. Thus, subtracted video signal is transmitted through terminal Ti, analog switch AS1 to output terminal Tg.

On the contrary, when the readout signal from CCD 1 as obtained from terminal Tc is greater than that of the threshold level Vth, that is when the image corresponding to that signal has a brightness above a certain level, comparator 4 produces a LOW signal. Thus, inverter IN1 produces a HIGH signal to make analog switch AS2, and inverter IN2 produces LOW to brake analog switch AS1. Thus, a video signal without being subtracted is produced from output terminal Tg.

According to one embodiment of the present invention, the signals applied to circuits 2, 3, 4 and 5 shown in FIG. 5 can be processed in a digital form. In such a case, an analog-to-digital converter 20 is inserted between CCD 1 and switch S1, and a digital-to-analog converter 21 is connected after output terminal Tg, as indicated in FIG. 5.

Although the present invention has been fully modifications and variations thereof will now be apparent to those skilled in the art, and the scope of the present invention is therefore to be limited not by the details of the preferred embodiment described above, but only by the terms of appended claims.

What is claimed is:

1. A CCD imager comprising:

CCD (1) having a plurality of photoelectric transducers (P) aligned vertically and horizontally, with at least one horizontal line (H') being masked, said CCD (1) producing unmasked horizontal line signals obtained from unmasked horizontal lines and masked horizontal line signal obtained from said masked horizontal line;

a line memory (2) for storing said masked horizontal line signal and for producing said masked horizontal line signal repeatedly and serially;

a subtracter (3) for subtracting said masked horizontal line signal from each unmasked horizontal line signal and for producing a subtracted signal;

a constant voltage source (5) for producing a threshold voltage;

a comparator for comparing said unmasked horizontal line signal with said threshold voltage and for producing a first signal when said unmasked horizontal line signal is below said threshold voltage and a second signal when the same is above said threshold voltage;

A switch means coupled to said comparator for permitting said subtracted signal to pass therethrough when said first signal is produced, and for permitting said unmasked horizontal line signal to pass therethrough when said second signal is produced.

* * * * *